US006206744B1

(12) United States Patent
Wigutow

(10) Patent No.: US 6,206,744 B1
(45) Date of Patent: Mar. 27, 2001

(54) INSULATED FLOTATION GARMENTS

(76) Inventor: Jerald N. Wigutow, 2482 Industrial Blvd., Grand Junction, CO (US) 81502

( * ) Notice: Subject to any disclaimer, the term of this patent is extended or adjusted under 35 U.S.C. 154(b) by 0 days.

(21) Appl. No.: 09/240,655

(22) Filed: Jan. 29, 1999

(51) Int. Cl.$^7$ ................................................. B63C 9/08
(52) U.S. Cl. ........................... 441/88; 441/104; 441/120; 441/112
(58) Field of Search ............................... 2/67, 458, 2.15, 2/2.16; 441/80, 88, 106–120

(56) References Cited

U.S. PATENT DOCUMENTS

| | | | |
|---|---|---|---|
| 3,228,034 | 1/1966 | Grove | 2/69.5 |
| 3,284,818 | 11/1966 | Lutz | 5/343 |
| 3,334,363 | 8/1967 | Lutz | 5/343 |
| 3,461,026 | 8/1969 | Schick | 161/154 |
| 3,510,889 | 5/1970 | Peterson | 5/343 |
| 3,564,629 | 2/1971 | Rogius | 5/343 |
| 3,584,323 | 6/1971 | Worley | 5/343 |
| 3,787,906 | 1/1974 | Hunt | 5/343 |
| 3,801,420 | 4/1974 | Anderson | 161/52 |
| 3,839,756 | 10/1974 | Hibbert | 5/343 |
| 3,842,454 | 10/1974 | Young | 5/343 |
| 3,952,134 | 4/1976 | Watson | 428/391 |
| 3,959,834 | 6/1976 | Hunt | 5/343 |
| 4,090,269 | 5/1978 | Hunt | 5/343 |
| 4,118,531 | 10/1978 | Hauser | 428/224 |
| 4,147,829 | 4/1979 | Holland | 428/311 |
| 4,354,281 | 10/1982 | Satoh | 2/69.5 |
| 4,395,455 | 7/1983 | Frankosky | 428/299 |
| 4,416,641 | * 11/1983 | Spinosa et al. | 441/94 |
| 4,420,521 | 12/1983 | Carr | 428/74 |
| 4,588,635 | 5/1986 | Donovan | 428/288 |
| 4,668,202 | * 5/1987 | Scheurer et al. | 441/116 |
| 4,910,055 | 3/1990 | Wigutow | 428/36.1 |
| 5,257,427 | 11/1993 | Hinshaw | 5/413 |
| 6,112,328 | * 9/2000 | Spector | 2/69 |

FOREIGN PATENT DOCUMENTS 2155773   10/1985   (GB) .
WO 81/03503   12/1981   (WO) .

OTHER PUBLICATIONS

Wiggy's Inc., The Insulated Float Coat, Jun. 1998, pp. 1–14.
Sole Suppliers, Robert Maynard Ltd., Therma–Float, Jun. 1998, p. 1.
Wiggy's Inc., Wiggy's Bags, Aug. 1998, pp. 4–5.
Wiggy's Inc., Insulated Flotation Suit, Sep. 1999, pp. 1–2.
Wiggy's Inc., Insulated Flotation Garments, Sep. 1998, pp. 1–2.
Eagle Enterprises, Inc., Survival Safety Rescue, information from the Internet, as early as Feb. 25, 1998.

* cited by examiner

*Primary Examiner*—Ed Swinehart
(74) *Attorney, Agent, or Firm*—Rhodes & Mason, PLLC

(57) ABSTRACT

An insulated flotation garment that has an insulating element and a flotation element bonded together by perimeter stitching to protect persons by keeping them warm and preventing them from being submerged in cold water.

22 Claims, 1 Drawing Sheet

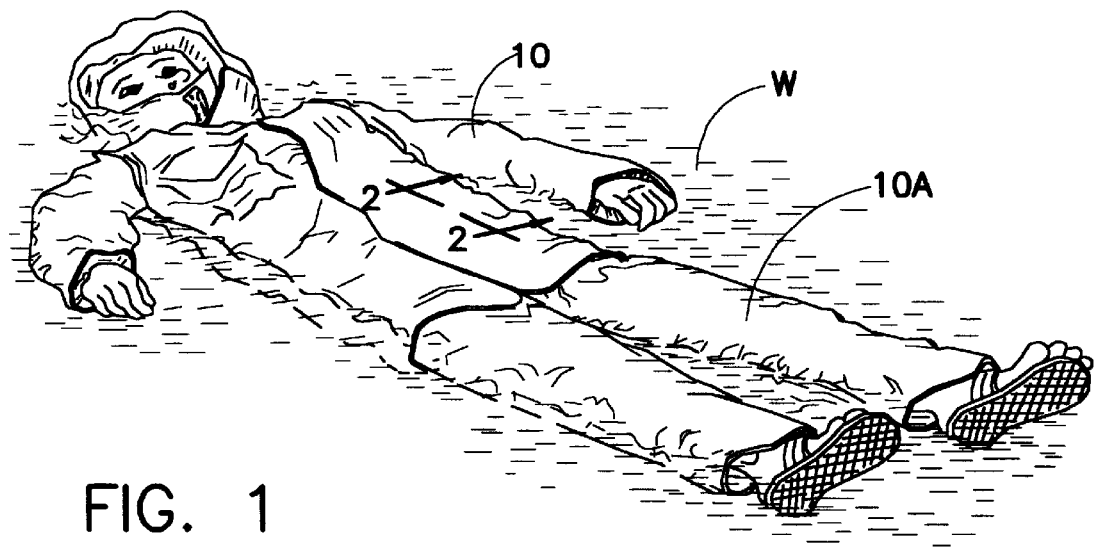
FIG. 1
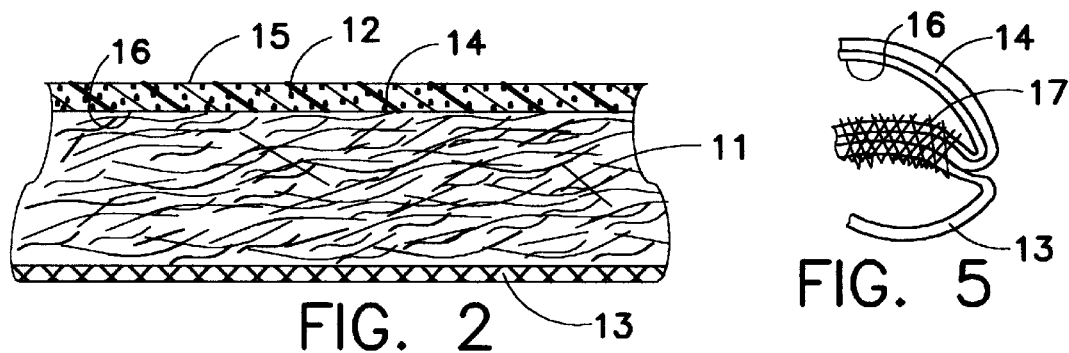
FIG. 2
FIG. 5
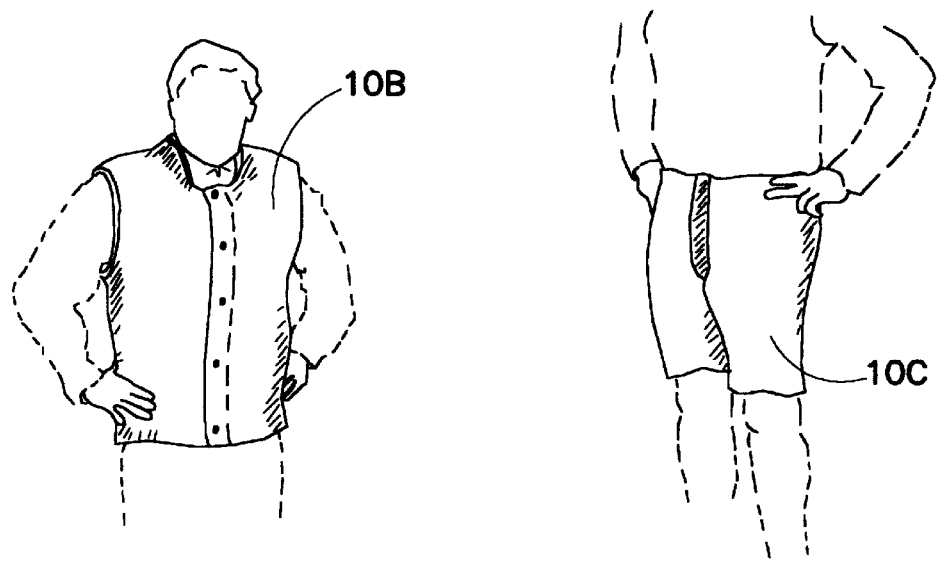
FIG. 3
FIG. 4

INSULATED FLOTATION GARMENTS

FIELD OF THE INVENTION

Insulated flotation garments are intended to be worn by persons on boats during cold weather. They contain insulation to keep the wearer warm and they contain a flotation element that provides buoyancy to keep the wearer afloat when in the water.

BACKGROUND OF THE INVENTION

Occupants of fishing boats, and others interested in surviving in cold water, have worn immersion suits to protect them if they accidentally fall in the water. The immersion suits are water-tight and serve the purpose of preventing water from reaching the clothing or body of the wearer, but they are heavy and cumbersome Heavy and cumbersome slickers are also worn by occupants of fishing boats.

Persons interested in surviving in water have also used flotation materials having a plurality of air pockets to provide buoyancy. One such flotation material is made by Uniroyal and sold under the trademark ENSOLITE. A flotation garment lined with ENSOLITE is effective in keeping a person afloat, but the ENSOLITE material has been found to be not suitable for the flotation element of this invention because it is not suitable for lamination.

SUMMARY OF THE INVENTION

The principal components of an insulated flotation garment made in accordance with this invention are an insulation element and a flotation element.

The preferred insulation for the insulation element is sold under the trademark LAMILITE by Wiggy's, Inc., 2842 Industrial Boulevard, Grand Junction, Colo. 81505, and described in U.S. Pat. No. 4,910,055.

The preferred flotation element comprises a flotation foam, which is a thin layer of low density polyethylene with a large number of tiny air pockets. That thin layer of low density polyethylene is laminated to a ripstop nylon shell. The complete flotation element has a thickness of one millimeter (1 mm).

The ripstop nylon shell of the flotation element is laminated to the insulation. The ripstop nylon shell material is urethane coated to male it water proof, and is laminated to the flotation foam. Perimeter stitching joins the edges of the flotation element with the edges of the insulation element.

The combined insulation and flotation elements are sewn into garments such as jackets, long pants, short pants, one piece suits, and vests. Mesh is preferably provided at the base of each garment to allow the water that gets into the garment to empty out easily when the wearer is out of the water.

BRIEF DESCRIPTION OF THE DRAWINGS

FIG. 1 is a perspective view illustrating the environment of the invention by showing a person wearing an insulated flotation jacket and insulated flotation long pants floating face up on a body of water;

FIG. 2 is an enlarged sectional view taken substantially along the line 2—2 in FIG. 1;

FIG. 3 is a perspective view of an insulated flotation vest on a person shown in dotted lines;

FIG. 4 is a perspective view of an insulated flotation pair of shorts on a person shown in dotted lines; and FIG. 5 is an enlarged sectional view, with parts broken away and omitting the insulation and air bubbles for clarity, to show the connection of the flotation element with the insulating element by perimeter stitching.

DETAILED DESCRIPTION OF THE INVENTION

Referring more specifically to the drawings, two insulated flotation garments are indicated at 10 and 10A in FIG. 1. The insulated flotation garment 10 is a parka and the insulated flotation garment 10A is long pants. FIG. 3 shows an insulated flotation garment made in the shape of a vest 10B, and FIG. 4 shows an insulated flotation garment made as short pants 10C. As illustrated in FIG. 2, each of the insulated flotation garments shown in FIGS. 1, 3, and 4 comprises an insulation element 11 and a flotation element 12. It is within the spirit and intent of the invention to make insulated floating garments of any desired shape with an insulation element 11 and a flotation element 12, and the reference numeral 10 is used hereafter to refer to a garment of any shape made with an insulation element 11 and a flotation element 12.

The insulation element 11 is preferably insulation of the type described and claimed in U.S. Pat. No. 4,910,055, issued Mar. 20, 1990 to Jerald N. Wigutow for INSULATED SLEEPING BAG. More specifically, the insulation element 11 preferably comprises at least one layer of unbonded and unquilted silicon treated continuous filament fibers and outer layers of chopped staple synthetic fibers intermixed with the continuous filament fibers. The insulation element 11 includes a fabric liner 13 formed of nylon taffeta or the like. The fabric liner 13 is joined by adhesive (not shown) to the fibers on the side of the insulation element 11 opposite the flotation element of each insulated flotation garment.

The flotation element 12 comprises a thin layer of low density polyethylene 14 with a large number of tiny air pockets 15, there being approximately 200,000 air pockets in some of the larger insulated flotation garments of this invention. The thin layer of low density polyethylene 14 is laminated to a shell layer of nylon 16. The complete flotation element 12 has a thickness of one millimeter (1 mm). The layer 14, with the air pockets, becomes the outer surface of each of the insulated flotation garments.

The insulation element 11 and the flotation element 12 are sewn together by perimeter stitching 17 (FIG. 5) that extends around the marginal edges of those two elements.

When a person wearing an insulated flotation garment of this invention is in the water W, as in FIG. 1, water enters the garment through the perimeter stitching and saturates the insulation 11. The insulation is formed of synthetic fibers that do not absorb the water and do not restrict movement of the wearer. Some water may get in the space between the garment 10 and the body of the wearer. Substantially all water that enters through the perimeter stitching 17 remains in the garment.

The water that enters through the perimeter stitching 17 and remains in the garment 10 is heated by the body temperature of the wearer. The heated water is insulated from outside temperature by the insulation element 11 and warms the body of the wearer.

A person wearing the insulated flotation garments 10 and 10A, as shown in FIG. 1, will float face-up when in the water. This is believed to be caused by the large number of tiny air pockets in the flotation element 12 that are uniformly distributed about the wearer's body.

There is thus provided a durable and effective garment for sustaining a person in the water.

Although specific terms have been used in describing the invention, they have been used in a generic and descriptive sense only and not for the purpose of limitation, the scope of the invention being defined in the following claims.

I claim:

1. An insulated flotation garment comprising:
   a fibrous insulation element; and
   a flotation element;
   wherein the insulation element and the flotation element are joined together and fashioned into the shape of a garment.

2. An insulated flotation garment according to claim 1 wherein the flotation element comprises flotation foam.

3. An insulated flotation garment according to claim 1 wherein the insulation element includes a fabric liner joined to a side of the insulation element opposite the flotation element.

4. An insulated flotation garment according to claim 1 wherein the insulation element and the flotation element are fashioned into the shape of a vest.

5. An insulated flotation garment according to claim 1 wherein the insulation element and the flotation element are fashioned into the shape of short pants.

6. An insulated flotation garment according to claim 1 wherein the insulation element and the flotation element are fashioned into the shape of a one piece suit.

7. An insulated flotation garment according to claim 1 wherein the insulation element and the flotation element are fashioned into the shape of a parka.

8. An insulated flotation garment according to claim 1 wherein the insulation element and the flotation element are joined together by perimeter stitching.

9. An insulated flotation garment according to claim 2 wherein the flotation foam is polyethylene.

10. An insulated flotation garment according to claim 1 wherein the flotation element includes a fabric shell joined to a side of the flotation element that faces the insulation element.

11. An insulated flotation garment according to claim 10 wherein the fabric shell is nylon.

12. An insulated flotation garment according to claim 10 wherein the complete flotation element is about one millimeter (1 mm) thick.

13. An insulated flotation garment according to claim 1 wherein the fibrous insulation comprises fibers and the garment retains water without the fibers absorbing the water.

14. An insulated flotation garment according to claim 1 wherein the fibrous insulation includes continuous filament fibers and chopped staple fibers.

15. An insulated flotation garment according to claim 3 wherein the fabric liner is nylon taffeta.

16. An insulated flotation garment comprising an insulation element and a flotation element joined together and fashioned into the shape of a garment, wherein the insulation element comprises at least one layer of unbonded and unquilted silicon treated continuous filament fibers and outer layers of chopped staple synthetic fibers intermixed with the continuous filament fibers, and a fabric liner.

17. An insulated flotation garment according to claim 16 wherein the fabric liner is formed of nylon taffeta.

18. An insulated flotation garment comprising an insulation element and a flotation element joined together and fashioned into the shape of a garment, wherein the insulation element comprises at least one layer of unbonded and unquilted silicon treated continuous filament fibers and outer layers of chopped staple synthetic fibers intermixed with the continuous filament fibers, and wherein the flotation element comprises a thin layer of low density polyethylene with a large number of tiny air pockets, the thin layer of low density polyethylene being laminated to a shell layer of nylon.

19. An insulated flotation garment according to claim 18 wherein the complete flotation element has a thickness of one millimeter.

20. An insulated flotation garment comprising an insulation element and a flotation element joined together and fashioned into the shape of a garment, said insulation element comprising at least one layer of unbonded and unquilted silicon treated continuous filament fibers and outer layers of chopped staple synthetic fibers intermixed with the continuous filament fibers.

21. An insulated flotation garment comprising:
    a fibrous insulation element comprising fibers; and
    a separate flotation element;
    wherein the insulation element and the flotation element are joined together and fashioned into the shape of a garment; and
    wherein the garment retains water without the fibers absorbing the water.

22. An insulated flotation garment according to claim 21 wherein tie fibers of the fibrous insulation element comprise continuous filament fibers and chopped staple fibers.

* * * * *